(12) United States Patent
Lee et al.

(10) Patent No.: US 10,641,320 B2
(45) Date of Patent: May 5, 2020

(54) SHOCK REDUCING TAPE SPRING HINGE

(71) Applicant: Korea Aerospace Research Institute, Daejeon (KR)

(72) Inventors: Chang Ho Lee, Daejeon (KR); Kyung Won Kim, Daejeon (KR); Ju Won Jeong, Daejeon (KR); Young Jin Kim, Gyeongsangnam-do (KR); Jung Ju Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 503 days.

(21) Appl. No.: 15/448,889

(22) Filed: Mar. 3, 2017

(65) Prior Publication Data

US 2018/0142729 A1 May 24, 2018

(30) Foreign Application Priority Data

Nov. 21, 2016 (KR) .......................... 10-2016-0155022

(51) Int. Cl.
*F16C 11/12* (2006.01)
*F16F 3/02* (2006.01)
*F16F 1/02* (2006.01)
*B64G 1/22* (2006.01)
*F16F 13/00* (2006.01)
*B64G 1/44* (2006.01)

(52) U.S. Cl.
CPC .............. *F16C 11/12* (2013.01); *B64G 1/222* (2013.01); *F16F 1/027* (2013.01); *F16F 3/02* (2013.01); *F16F 13/00* (2013.01); *B64G 1/443* (2013.01); *F16F 2224/0258* (2013.01)

(58) Field of Classification Search
USPC ........................................................... 16/225
See application file for complete search history.

(56) References Cited

U.S. PATENT DOCUMENTS

| 6,175,989 B1 | 1/2001 | Carpenter et al. |
| 7,354,033 B1 | 4/2008 | Murphey et al. |
| 7,685,676 B2 * | 3/2010 | McClellan ................ E05D 1/02 16/221 |

FOREIGN PATENT DOCUMENTS

| KR | 101495246 B1 | 2/2015 |
| KR | 10-2015-0086419 | 7/2015 |

OTHER PUBLICATIONS

Lee et al., "Deployment shock attenuation of a solar array tape hinge by means of the Martensite detwinning of NiTi Shape Memory Alloy", AIP Review of Scientific Instruments 87, 035104 Mar. 7, 2016, 11 pages.

(Continued)

*Primary Examiner* — Reginald S Tillman, Jr.

(57) ABSTRACT

Provided is a shock reducing tape spring hinge including fixing members fixed to at least two objects, respectively, a thin shell type tape spring having both end portions that are fastened to the fixing members, respectively, and a shell-shaped damping plate aligned with the tape spring, the damping plate having both end portions that are fastened to the fixing members, respectively. The damping plate and the tape spring may be configured to connect the at least two objects being spaced through the fixing members, and the damping plate may be configured to reduce a deployment shock occurring when the tape spring is deployed.

9 Claims, 9 Drawing Sheets

(56) References Cited

OTHER PUBLICATIONS

Lee, Chang Ho, "Shock Attenuation of a Solar Array Hinge by means of the Martensite Detwinning of NiTi SMA", PhD Dissertation, Korea Advanced Institute of Science and Technology, (Abstract) May 24, 2016, 5 pages including 2 pages English translation.

* cited by examiner

SHOCK REDUCING TAPE SPRING HINGE

CROSS-REFERENCE TO RELATED APPLICATION(S)

This application claims the priority benefit of Korean Patent Application No. 10-2016-0155022 filed on Nov. 21, 2016, in the Korean Intellectual Property Office, the disclosure of which is incorporated herein by reference for all purposes.

BACKGROUND

1. Field

One or more example embodiments relate to a shock reducing tape spring hinge, and more particularly, to a shock reducing tape spring hinge that may reduce a deployment shock and an overshoot behavior when the tape spring hinge is deployed, and adjust a deployment speed as requested by a user, by inserting a shape memory alloy between tape spring hinges.

2. Description of Related Art

A tape spring is a thin-walled, open cylindrical structure with a natural transverse curvature. It can be elastically deformed within its longitudinal plane to yield a well-defined elastic fold.

A shape memory alloy is an alloy that remembers its original shape although deformed by a force exerted thereto, and returns to the original shape when heated.

The shape memory alloy was defined with the discovery of a shape memory effect of a nickel-titanium alloy that remembers a high-temperature shape and returns to the original shape when heated although deformed greatly at a low temperature.

Such a shape memory alloy has a great elasticity and an excellent auto-absorbance, for example, a damping characteristic, in addition to the shape memory characteristic. The shape memory alloy is applied to medical devices such as an artificial organ and an osteosynthesis plate, temperature devices such as a fire alarm, and actuators.

Shape memory alloys having been discovered thus far include a nickel-titanium alloy, a copper-zinc alloy, a gold-cadmium alloy, and an indium-thallium alloy. Herein, experiments were conducted using the nickel-titanium alloy.

A nickel-titanium shape memory alloy and a method of manufacturing the same are described in detail in Korean Patent Application No. 10-2014-0006040, entitled "Method for manufacturing Ni—Ti shape memory alloy".

SUMMARY

An aspect provides a shock reducing tape spring hinge that may reduce a hinge deployment shock of a tape spring.

Another aspect also provides a shock reducing tape spring hinge that may reduce a hinge overshooting motion of a tape spring.

Still another aspect also provides a shock reducing tape spring hinge that may improve a durability of a tape spring.

Yet another aspect also provides a shock reducing tape spring hinge that may adjust a hinge deployment speed using a phase transformation of a shape memory alloy.

Further another aspect also provides a tape spring hinge that may not require a secondary deployment actuator such as a heater.

According to an aspect, there is provided a shock reducing tape spring hinge including fixing members fixed to at least two objects, respectively, a thin shell type tape spring having both end portions that are fastened to the fixing members, respectively, and a shell-shaped damping plate aligned with the tape spring, the damping plate having both end portions that are fastened to the fixing members, respectively. The damping plate and the tape spring may be configured to connect the at least two objects being spaced through the fixing members, and the damping plate may be configured to reduce a deployment shock occurring when the tape spring is deployed.

Two tape springs may be disposed parallel to each other, and the damping plate may be disposed between the two tape springs.

The damping plate may have a shape, stiffness, and strength that change according to a temperature.

The shock reducing tape spring hinge may be deployed in a state of being bent by an elastic moment of the tape spring, and simultaneously the damping plate may be configured to reduce a deployment speed of the tape spring by generating a reducing moment corresponding to a deployment moment of the tape spring.

An opening may be formed at a center of the damping plate to determine a reducing moment of the damping plate corresponding to a deployment moment caused by the tape spring.

The tape spring and the damping plate may each have a curved cross section.

According to another aspect, there is also provided a solar array wing for a satellite including a shock reducing hinge, the solar array wing including several solar panels, and a shock reducing hinge being bent, the shock reducing hinge configured to connect the several solar panels. The shock reducing hinge may include a shell-shaped damping plate, and fixing members fastened to both end portions of the damping plate. The fixing members may be connected to the several solar panels, and the damping plate may be disposed between the solar panels to reduce deployment shocks of the solar array wing.

The damping plate may be configured to be deformed by performing a martensite phase transformation or an austenite phase transformation based on a temperature.

The damping plate may be largely deformed by a martensite detwinning transformation, and reduce a deployment shock of the tape springs by causing a residual moment that resists a deployment moment of the tape springs.

The damping plate may return to the original shape by performing an austenite phase transformation based on a change in temperature condition. In this condition, a stiffness of the damping plate will increase, and thus an alignment characteristic and a stiffness of the shock reducing hinge will increase after the deployment.

A phase transformation start temperature of the damping plate may be determined based on constituents thereof, and the damping plate may be replaceable with a damping plate including different constituents.

The shock reducing hinge may further include a tape spring having a curved cross section, and the tape spring may be aligned with the damping plate and fastened to the fixing members.

The shock reducing hinge may further include a heater configured to supply heat to the shock reducing hinge.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
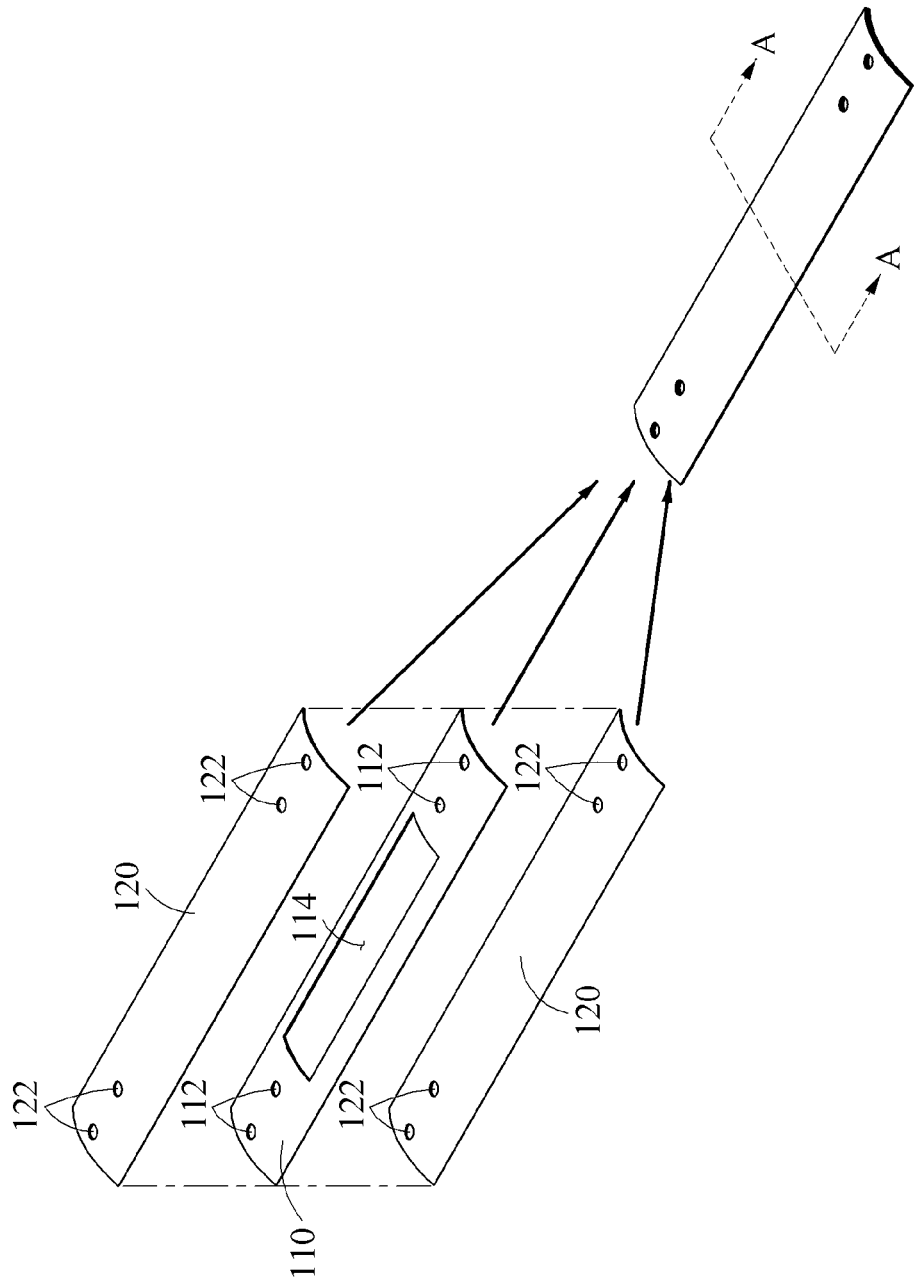
FIGS. 1A and 1B are exploded perspective views illustrating a shock reducing tape spring hinge according to an example embodiment.

Hereinafter, embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the embodiments.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 1B:
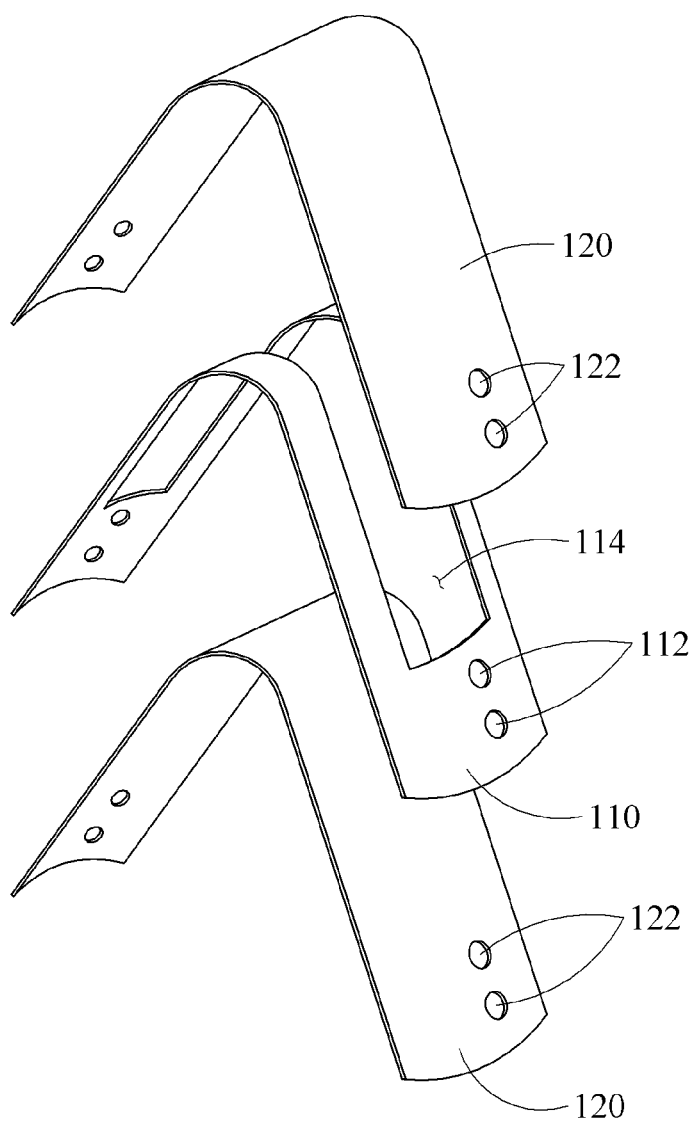
Figure 1C:
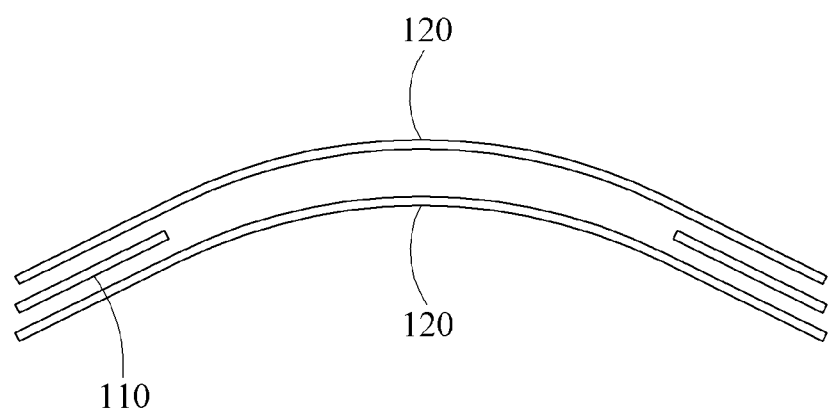
FIG. 1C is a cross-sectional view of the shock reducing tape spring hinge of FIG. 1A, cut along a line A-A.
Figure 2A:
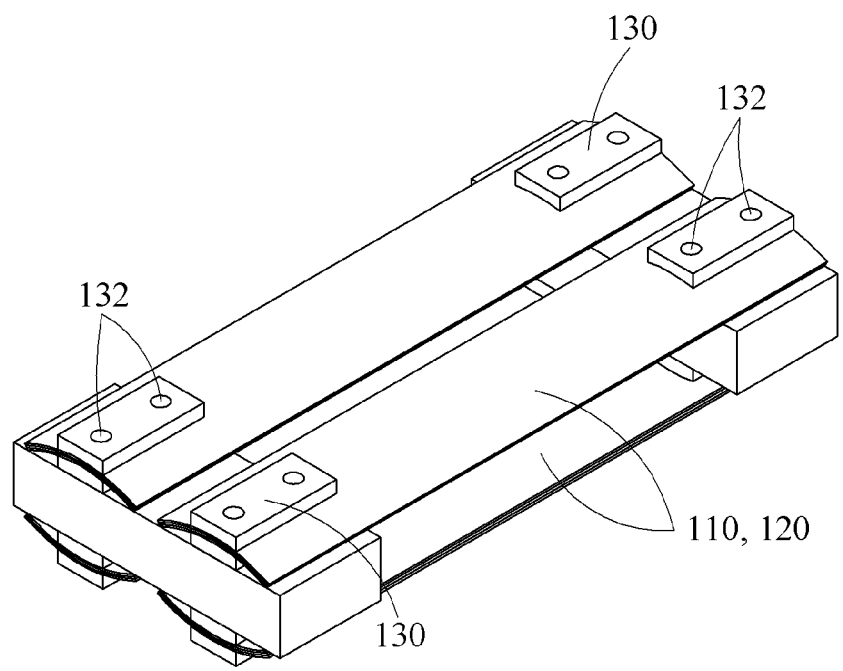
FIGS. 2A and 2B are perspective views illustrating a shock reducing tape spring hinge according to an example embodiment.
Figure 2B:
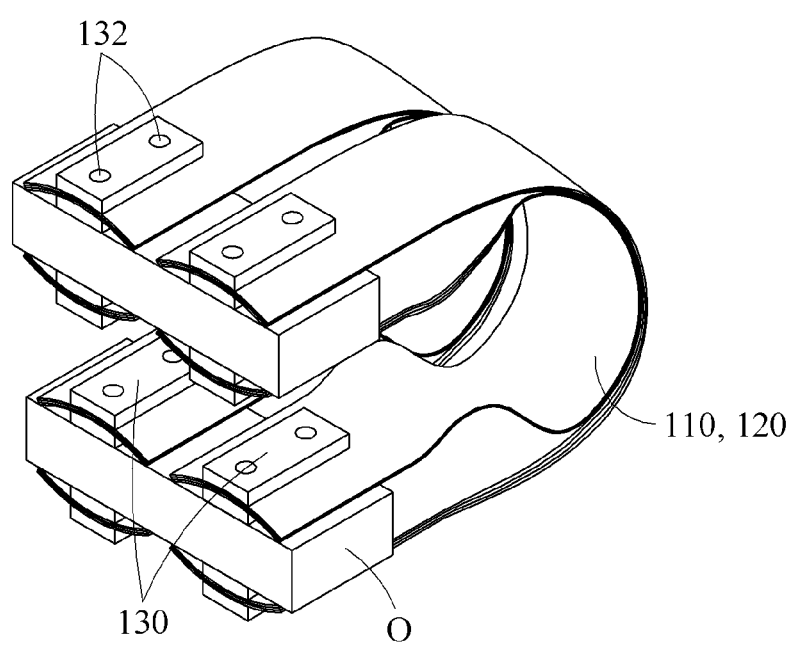

FIGS. 1A and 1B are exploded perspective views illustrating a shock reducing tape spring hinge according to an example embodiment, FIG. 1C is a cross-sectional view of the shock reducing tape spring hinge, and FIGS. 2A and 2B are perspective views illustrating the shock reducing tape spring hinge according to an example embodiment.

A shock reducing tape spring hinge 100 according to an example embodiment deploys an object O, which will be described in detail below.

Referring to FIGS. 1A through 2B, the shock reducing tape spring hinge 100 may include tape springs 120, a damping plate 110, and fixing members 130.

The tape springs 120 may each be provided in a form of shell-shaped thin plate and have a curved cross section. The tape springs 120 may include sheet metal and be folded in a direction perpendicular to curved planes, and may cause a deployment moment by an elasticity in a state of being folded.

The damping plate 110 may be provided in a form of shell-shaped thin plate, similar to the tape springs 120. As shown in FIG. 1C, the damping plate 110 may have a curved cross section from which a central portion thereof is removed. Further, the damping plate 110 may be aligned with the tape springs 120. The damping plate 110 may be manufactured using a shape memory alloy, which will be described further below.

The damping plate 110 may include a third opening 114. The third opening 114 may increase a deployment reliability of the tape springs 120 and adjust a damping performance of the damping plate 110.

The fixing members 130 may fix both end portions of each of the tape springs 120 and the damping plate 110 to the object O. For example, at least one second opening 122 may be formed at each of both end portions of the tape springs 120, and at least one first opening 112 may be formed at each of both end portions of the damping plate 110. The fixing members 130 may each include protruding elements 132 configured to penetrate through the first openings 112 and the second openings 122 formed at both end portions of each of the tape springs 120 and the damping plate 110 such that one fixing member 110 and the tape springs 120 may be fastened to the other fixing member 110. That is, the first openings 112 and the second openings 122 may be aligned.

FIG. 1A illustrates the tape springs 120 and the damping plate 110 being aligned.

Referring to FIG. 1A, the damping plate 110 having a shape similar to those of the tape springs 120 may be disposed between the two tape springs 120, and the two tape springs 120 and the damping plate 110 may be bound as an integral body.

FIG. 1B is an exploded perspective view of the damping plate 110 and the tape springs 120 being folded.

Referring to FIG. 1B, the tape springs 120 and the damping plate 110 may be bent, and bent portions of the tape springs 120 and the damping plate 110 may be deformed from curved cross sections to straight cross sections. The tape springs 120 may be recovered from the straight cross sections to the curved cross sections by an elasticity. In this process, the bent shape may be deformed to the original shape, and an elasticity of the tape springs 120 may generate a deployment moment.

As shown in FIG. 2A, when bending the shock reducing tape spring hinge 100 by restraining both ends thereof, the shock reducing tape spring hinge 100 may be folded in a shape as shown in FIG. 2B.

Figure 3:
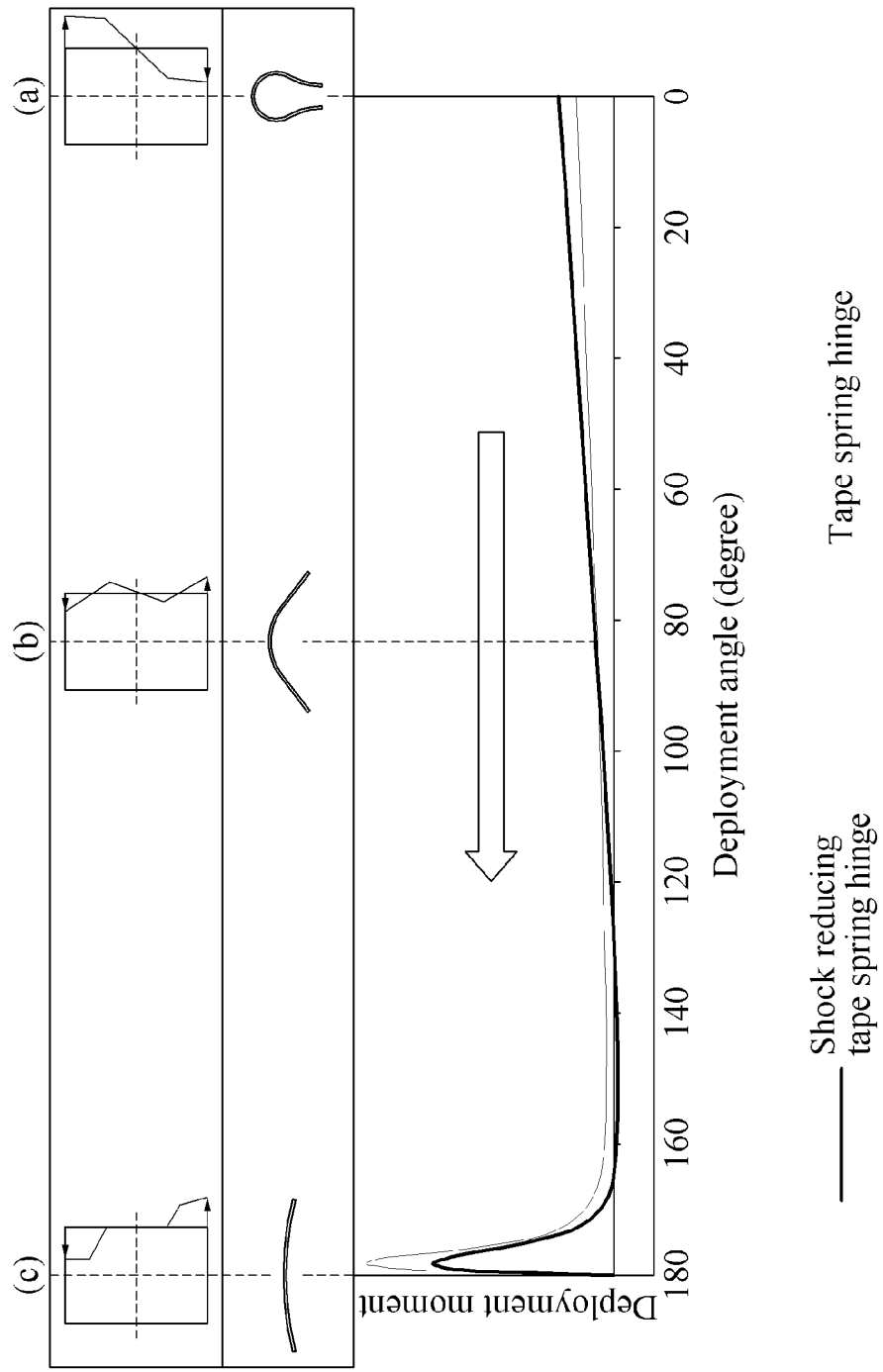
FIG. 3 illustrates a deployment process and a deployment moment of a shock reducing tape spring hinge according to an example embodiment.

In the shape of FIG. 2B, when both the restrained ends are released, the shock reducing tape spring hinge 100 may return to the shape as shown in FIG. 2A. In this example, a deployment moment applied to the shock reducing tape spring hinge 100 may change as shown in FIG. 3. Immediately after fully deployed, the shock reducing tape spring hinge 100 may overshoot slightly in a direction opposite to a direction in which the shock reducing tape spring hinge 100 was bent at first. These behavior will be described further below.

FIG. 1C illustrates the tape springs 120 and the damping plate 110 being cut in a transverse direction.

FIG. 2B is a perspective view illustrating the shock reducing tape spring hinge 100 being folded, and FIG. 2A is a perspective view illustrating the shock reducing tape spring hinge 100 being deployed.

Referring to FIGS. 2A and 2B, the shock reducing tape spring hinge 100 may be fixed to the object O through the fixing members 130.

For example, the tape springs 120 and the damping plate 110 may be penetrated by the protruding elements 132 of each of the fixing members 130, and the protruding elements 132 may penetrate through the object O. Further, the protruding elements 132 may penetrate through the other one of the fixing members 130, thereby being attached to the object O disposed between the fixing members 130.

The tape springs 120 and the damping plate 110 may connect several objects O, as shown in FIGS. 2A and 2B.

Figure 2C:
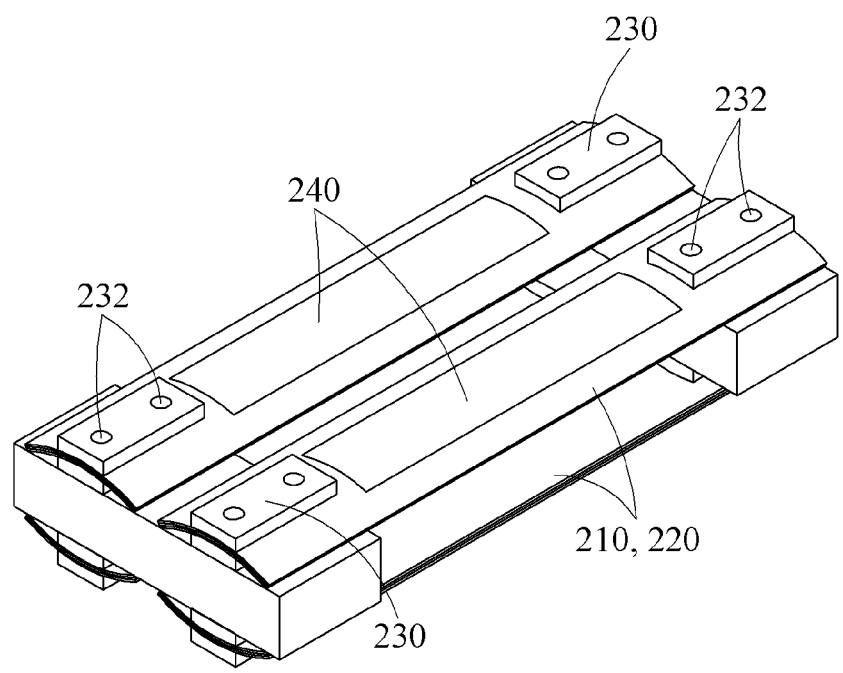
FIG. 2C is a perspective view illustrating a shock reducing tape spring hinge according to an example embodiment.

FIG. 2C is a perspective view illustrating a shock reducing hinge according to an example embodiment.

Referring to FIG. 2C, the shock reducing hinge 200 may include a damping plate 210, a tape spring 220, fixing members 230, protruding elements 232, and patch heaters 240.

In detail, the damping plate 210, the tape spring 220, the fixing members 230, and the protruding elements 232 may be the same as the constituents described with reference to FIGS. 1A through 2B, and thus duplicated descriptions will be omitted for conciseness. The patch heaters 240 may transmit heat to a central portion of the shock reducing hinge 200 for a phase transformation of the shock reducing hinge 200.

FIG. 3 illustrates a deployment process of the shock reducing tape spring hinge 100.

In detail, FIG. 3 illustrates the deployment process including an operation (a) in which the tape springs 120 and the damping plate 110 are folded such that an angle between both end portions thereof is 0 degrees, an operation (b) in which the tape springs 120 and the damping plate 110 are deployed at an angle of about 80 degrees, and an operation (c) in which the tape springs 120 and the damping plate 110 are deployed at an angle of about 180 degrees. FIG. 3 represents a change in transverse bending stress distribution, a change in longitudinal shape of the shock reducing tape spring hinge 100, and a change in deployment moment of the shock reducing tape spring hinge 100.

The damping plate 110 may reduce a deployment shock occurring as the tape springs 120 are deployed. The damping plate 110 may include a shape memory alloy for transition from the operation (a) to the operation (c).

Referring to FIG. 3, the operation (a) is an initial operation in which the shock reducing tape spring hinge 100 is being folded in a martensite state. The folded damping plate 110 may undergo a martensitic detwinning transformation from an outer portions, whereby the damping plate 110 may be deformed to have a transverse curvature. In this example, an elastic energy of the damping plate 110 and a deployment moment produced by tape springs 120 are combined such that an initial deployment moment is greater than a deployment moment produced only by the tape springs 120. And thus a reliable deployment process may be initiated.

In detail, the shape memory alloy has a high-temperature austenite phase arrangement and a low-temperature martensite phase arrangement that considerably differ from each other. Thus, although deformed in the martensite phase, the shape memory alloy may return to the original shape as atoms in a crystal are rearranged in the austenite phase when heated above a predetermined temperature.

Further, the shape memory alloy may undergo large deformation by the martensitic detwinning transformation in the low-temperature martensite phase, and thus may return to the original shape by the austenite phase transformation. As the deployment process progresses, a residual moment present in the damping plate 110, that is, a moment that resists the deployment moment, may be balanced by the deployment moment of the tape springs 120. The deployment moment may become almost "0" in the operation (b), and be continuously decreased in a subsequent deployment process. Thus, a deployment speed of the shock reducing tape spring hinge 100 may be maintained at an appropriate level during the deployment process.

Immediately before the last operation (c), the deployment moment by the tape springs 120 may be maximized, and thus a deployment shock may occur. In the operation (c), the damping plate 110 may cause a residual moment, and thus reduce the deployment moment of the tape springs 120 and the resulting deployment shock.

After the shock reducing tape spring hinge 100 is deployed, the temperature of the damping plate 110 may be increased so that the damping plate 110 may be transformed to an austenite phase.

For example, in a case in which the shock reducing tape spring hinge 100 is used as a solar array wing deploying hinge for a satellite, the temperature of the damping plate 110 may naturally increase with an increase in the temperature of solar panel by sunlight, and thus the austenite phase transformation may occur.

In a case in which the natural increase in the temperature of the shock reducing tape spring hinge 100 is difficult, the patch heaters 240 may be installed in outer surface of the tape springs 120 as shown in FIG. 2C, to increase the temperature of the damping plate 110, whereby the austenite phase transformation may occur.

When the austenite phase transformation is completed, the stiffness of the shock reducing tape spring hinge 100, 200 may increase and an alignment characteristic thereof may improve.

In detail, the shape memory alloy of the damping plate 110 may have a shape, stiffness, and strength that change according to a temperature. The elastic moment for the deployment of the damping plate 110 and the residual moment to resist the deployment may be adjusted based on components or a characteristic of the shape memory alloy constituting the damping plate 110, and may be adjusted using the third opening 114 formed in the damping plate 110 as shown in FIG. 1A.

Further, the temperature at which the damping plate 110 starts the phase transformation may be adjusted by the components of the shape memory alloy.

The damping plate 110 of the shock reducing tape spring hinge 100 may be replaced with another damping plate having different components or an opening with a different size based on a purpose of use, for example, a temperature, a necessary residual force, and a necessary elastic moment.

Figure 4:
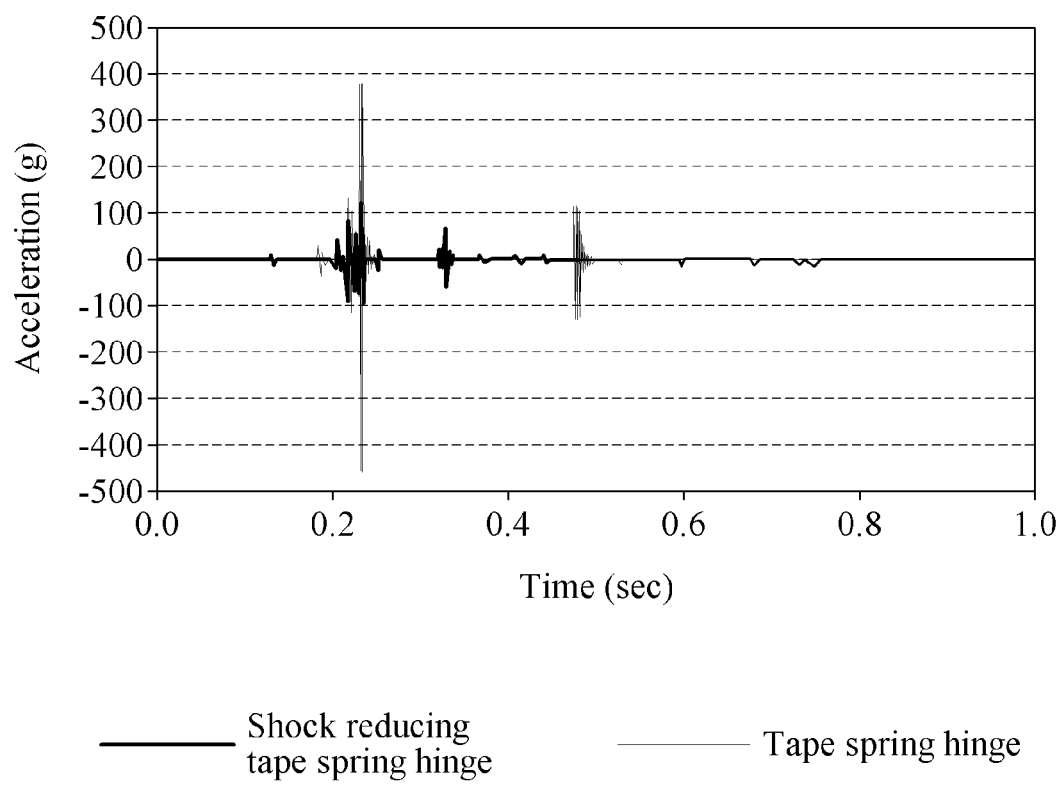
FIG. 4 illustrates a measured deployment shock of a shock reducing tape spring hinge according to an example embodiment.

FIG. 4 illustrates a measured deployment shock of the shock reducing tape spring hinge 100 according to an example embodiment.

Referring to FIG. 4, the deployment shock of the shock reducing tape spring hinge 100 may be reduced, when compared to a tape spring. A residual shock after the deployment shock occurs may also be reduced.

Figure 5:
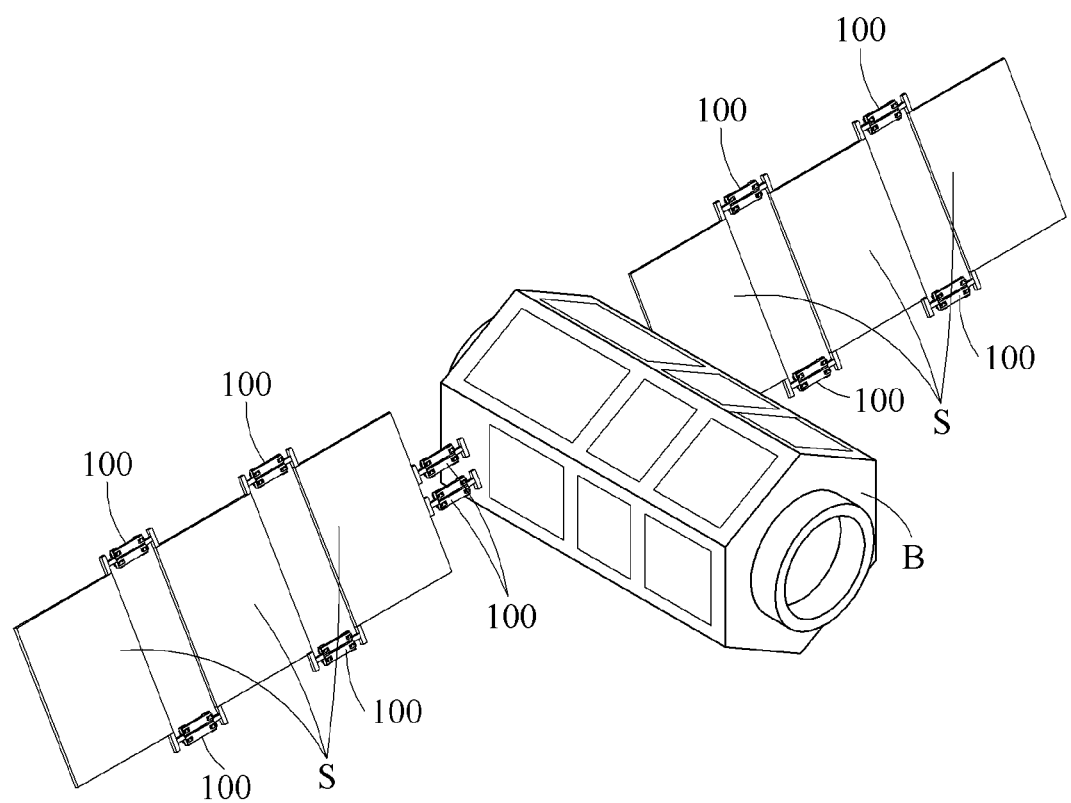
FIG. 5 illustrates a satellite including a shock reducing hinge on a solar array wing according to an example embodiment.

FIG. 5 illustrates a satellite including a shock reducing hinge on a solar array wing according to an example embodiment.

Referring to FIG. 5, a satellite includes a satellite body B, several solar panels S attached to the satellite body B, and shock reducing tape spring hinges 100 configured to connect the several solar panels S.

The shock reducing tape spring hinge 100 may each include a shell-shaped damping plate, and fixing members fastened to both end portions of the damping plate.

The damping plate may include a shape memory alloy, and thus a shape, stiffness, and strength of the damping plate may change according to a temperature.

When launching the satellite, the solar array wing S may be maintained to be folded using the shock reducing tape spring hinges 100 to reduce the volume of the satellite. When the satellite arrives at a space environment, the solar array wing S may be deployed using the shock reducing tape spring hinges 100 to supply power to the satellite using a greater amount of sunlight. The shock reducing tape spring hinges 100 may reduce deployment shocks of the solar array wing S, and increase the stiffness of the solar array wing S after the deployment.

In another example, the shock reducing hinges 200 including patch heaters may be installed in the solar array wing S to supply heat to the damping plate. Thus, a start of phase transformation of the damping plate may be directly controlled.

According to example embodiments, a shock reducing tape spring hinge may reduce a hinge deployment shock of a tape spring, reduce a hinge backward overshooting motion, improve a durability of the tape spring, and adjust a hinge deployment speed using a phase transformation of a shape memory alloy provided in the tape spring hinge. Further, the shock reducing tape spring hinge may be deployed in a space without a secondary deployment actuator such as heater.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A shock reducing tape spring hinge, comprising:
    fixing members fixed to at least two objects, respectively;
    a first tape spring having both end portions that are fastened to the fixing members, respectively; and
    a shape memory alloy damping plate aligned with the first tape spring, the shape memory alloy damping plate having both end portions that are fastened to the fixing members, respectively,
    wherein the shape memory alloy damping plate and the first tape spring are configured to connect the at least two objects being spaced through the fixing members, and the shape memory alloy damping plate is configured to reduce a deployment shock occurring when the first tape spring is deployed, and
    wherein the shape memory alloy damping plate has an opening and the opening has a size, and
    wherein at least the opening of the shape memory alloy damping plate and the size of the opening define a residual moment of the shape memory alloy damping plate that resists a deployment moment caused by the deployment of the first tape spring.

2. The shock reducing tape spring hinge of claim 1, further comprising a second tape spring, wherein the first and second tape springs are disposed parallel to each other, and
    the shape memory alloy damping plate is disposed between the first and second tape springs.

3. The shock reducing tape spring hinge of claim 1, wherein the shape memory alloy damping plate has a crystal structure and a mechanical characteristic that change based on a temperature.

4. The shock reducing tape spring hinge of claim 3, wherein the shape memory alloy damping plate comprises a shape memory alloy, and
    the shape memory alloy damping plate is deployed in a state of being bent along with the first tape spring, and simultaneously the shape memory alloy damping plate is configured to reduce a deployment speed of the first tape spring based at least in part on the residual moment corresponding to the deployment moment of the first tape spring.

5. The shock reducing tape spring hinge of claim 1, wherein the opening is formed or arranged at a center of the shape memory alloy damping plate.

6. The shock reducing tape spring hinge of claim 1, wherein the first tape spring and the shape memory alloy damping plate each have a curved cross section.

7. The shock reducing tape spring hinge of claim 1, wherein the residual moment is adjusted when at least the size of the opening is adjusted.

8. The shock reducing tape spring hinge of claim 4, wherein the deployment moment and/or the residual moment is adjusted based at least in part on: (i) one or more components or one or more characteristics of the shape memory alloy of the shape memory alloy damping plate and/or (ii) using the opening formed in the shape memory alloy damping plate.

9. The shock reducing tape spring hinge of claim 4, wherein a stiffness of the shape memory alloy damping plate increases as an austenite phase transformation occurs due to an increase of a temperature of a hinge which increases as a temperature of a solar array increases.

* * * * *